(12) United States Patent
Minato

(10) Patent No.: US 9,937,701 B2
(45) Date of Patent: Apr. 10, 2018

(54) REMOVING UNIT AND REMOVING METHOD

(71) Applicant: Oki Data Corporation, Tokyo (JP)

(72) Inventor: Masanori Minato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/229,104

(22) Filed: Aug. 4, 2016

(65) Prior Publication Data

US 2017/0072677 A1 Mar. 16, 2017

(30) Foreign Application Priority Data

Sep. 10, 2015 (JP) ................................ 2015-178376

(51) Int. Cl.
*B32B 38/10* (2006.01)
*B32B 43/00* (2006.01)
(Continued)

(52) U.S. Cl.
CPC .............. *B32B 43/006* (2013.01); *B26D 3/08* (2013.01); *B26D 7/18* (2013.01); *B31D 1/021* (2013.01); *B31D 1/026* (2013.01); *B32B 37/0053* (2013.01); *G09F 3/00* (2013.01); *B26F 1/38* (2013.01); *B31D 1/02* (2013.01); *B32B 38/10* (2013.01); *G09F 2003/0225* (2013.01); *G09F 2003/0226* (2013.01);
(Continued)

(58) Field of Classification Search
CPC . B32B 38/10; B32B 43/006; Y10T 156/1174; Y10T 156/1195; Y10T 156/195; Y10T 156/1956; Y10T 156/1994; B31D 1/02; G09F 2003/0225; G09F 2003/0227

USPC .......................... 156/715, 719, 759, 760, 767
See application file for complete search history.

(56) References Cited

U.S. PATENT DOCUMENTS 3,966,534 A * 6/1976 Oddy ..................... B31D 1/021
156/267
4,246,058 A * 1/1981 Reed .................... B26D 7/1827
156/183
4,306,928 A * 12/1981 Okui ..................... B26D 7/1827
156/267

(Continued)

FOREIGN PATENT DOCUMENTS

| JP | 03046689 A | 2/1991 |
|---|---|---|
| JP | 2011-183781 A | 9/2011 |
| JP | 2014-030953 A | 2/2014 |
| WO | WO 2014-152545 A1 | 9/2014 |

*Primary Examiner* — Mark A Osele
*Assistant Examiner* — Nickolas Harm
(74) *Attorney, Agent, or Firm* — Rabin & Berdo, P.C.

(57) ABSTRACT

Provided is a removing unit that includes: a first conveying roller, a second conveying roller, a third conveying roller, and a take-up roller. The first conveying roller conveys a stack including first and second base members which are removably stacked with respect to each other. The second conveying roller conveys the second base member from which the first base member has been removed. The third conveying roller conveys the first base member which has been removed from the second base member, along a surface of the first conveying roller. The take-up roller takes up the first base member which has been conveyed by the third conveying roller. The second conveying roller is provided upstream from a first tangent in a conveying direction of the first base member. The third conveying roller is provided to overlap the first tangent or provided downstream from the first tangent, in the conveying direction.

6 Claims, 6 Drawing Sheets

(51) Int. Cl.
    *B32B 37/00*     (2006.01)
    *G09F 3/00*     (2006.01)
    *B26D 7/18*     (2006.01)
    *B26D 3/08*     (2006.01)
    *G09F 3/02*     (2006.01)
    *B31D 1/02*     (2006.01)
    *B26F 1/38*     (2006.01)

(52) U.S. Cl.
    CPC . *G09F 2003/0227* (2013.01); *Y10T 156/1174* (2015.01); *Y10T 156/1195* (2015.01); *Y10T 156/195* (2015.01); *Y10T 156/1956* (2015.01); *Y10T 156/1994* (2015.01)

(56) References Cited

U.S. PATENT DOCUMENTS

| | | | | |
|---|---|---|---|---|
| 4,346,855 | A * | 8/1982 | Biggar, III | B26D 7/1827 156/267 |
| 4,405,401 | A * | 9/1983 | Stahl | G09F 3/04 156/248 |
| 5,351,426 | A * | 10/1994 | Voy | B31D 1/021 40/630 |
| 6,592,693 | B1 * | 7/2003 | Nedblake | B23K 26/0846 156/247 |
| 2013/0059106 | A1 * | 3/2013 | Bayzelon | B32B 7/06 428/41.8 |

* cited by examiner

20B(22Y)

21  22X
20A

REMOVING UNIT AND REMOVING METHOD

CROSS REFERENCE TO RELATED APPLICATIONS

This application claims the benefit of Japanese Priority Patent Application JP 2015-178376 filed on Sep. 10, 2015, the entire contents of which are incorporated herein by reference.

BACKGROUND

The invention relates to a removing unit that removes, from each other, two base members which are removably stacked with respect to each other, and to a removing method.

A removing unit is used in order to remove, from each other, two base members which are removably stacked with respect to each other. For example, the two base members to be removed from each other by the removing unit may be a seal. The seal includes a seal base member and a removing base member. The seal base member included in the seal has a surface that is provided with an adhesive layer. The removing base member includes a surface that is adjacent to the surface with the adhesive layer and is provided with a release layer.

Consideration has been given in various ways to a configuration of the removing unit. A specific example thereof involves a technique in which a web roll with sheets (including an adhesive sheet and a removing sheet) that have been taken up in a roll shape is used to remove part of the adhesive sheet (an unnecessary sheet) from the removing sheet. This technique uses a blade for folding the unnecessary sheet while removing the unnecessary sheet from the removing sheet. The technique uses a belt member that moves in a returnable manner in accordance with conveying of the sheets in order to reduce a burden such as an operation for adjusting a position of the blade. For example, reference is made to Japanese Unexamined Patent Application Publication No. 2011-183781.

SUMMARY

Various measures have been taken to improve a removing performance of a removing unit. However, the measures are not yet sufficient, still leaving a room for further improvement.

It is desirable to provide a removing unit and a removing method that achieve a superior removing performance.

A removing unit according to an embodiment of the invention includes: a first conveying roller that conveys a stack including a first base member and a second base member which are removably stacked with respect to each other; a second conveying roller that conveys the second base member from which the first base member has been removed; a third conveying roller that conveys the first base member which has been removed from the second base member, along a surface of the first conveying roller; and a take-up roller that takes up the first base member which has been conveyed by the third conveying roller. The second conveying roller is provided upstream from a first tangent in a conveying direction of the first base member which has been removed from the second base member. The first tangent is tangent to the first conveying roller on second-conveying-roller side on which the second conveying roller is provided and tangent to the take-up roller on the second-conveying-roller side. The third conveying roller is provided to overlap the first tangent in the conveying direction of the first base member, or provided downstream from the first tangent in the conveying direction of the first base member.

A removing method according to an embodiment of the invention includes: conveying, by a first conveying roller, a stack including a first base member and a second base member which are removably stacked with respect to each other; conveying, by a second conveying roller, the second base member from which the first base member has been removed; conveying, by a third conveying roller, the first base member which has been removed from the second base member, along a surface of the first conveying roller; and taking up, by a take-up roller, the first base member which has been conveyed by the third conveying roller. The second conveying roller is provided upstream from a first tangent in a conveying direction of the first base member which has been removed from the second base member. The first tangent is tangent to the first conveying roller on second-conveying-roller side on which the second conveying roller is provided and tangent to the take-up roller on the second-conveying-roller side. The third conveying roller is provided to overlap the first tangent in the conveying direction of the first base member, or provided downstream from the first tangent in the conveying direction of the first base member.

DETAILED DESCRIPTION

Some example embodiments of the invention are described below in detail with reference to the accompanying drawings. A description is given in the following order. It is to be noted that the following description is directed to illustrative examples of the invention and not to be construed as limiting to the invention. Factors including, without limitation, arrangement, dimensions, and a dimensional ratio of elements illustrated in each drawing are also illustrative only and not to be construed as limiting to the invention.
1. First Example Embodiment (Removing Unit)
   1-1. Configuration
   1-2. Operation (Removing Method)
   1-3. Workings and Effects
2. Second Example Embodiment (Removing Unit and Removing Method)
3. Modifications

1. First Example Embodiment (Removing Unit)

A removing unit according to a first example embodiment of the invention is described below.

The removing unit described below may be used to continuously remove, from each other, two base members (included in a stack 20 which will be described later) which are removably stacked with respect to each other. More specifically, the removing unit may take up one (a necessary base member 20A which will be described later) of the two base members and may take up the other (an unnecessary base member 20B which will be described later) of the two base members, while removing, from each other, the two base members.

A specific configuration of the stack 20 (including the necessary base member 20A and the unnecessary base member 20B) is described below in detail referring to FIGS. 3, 4, 7, and 8.

<1-1. Configuration>
[Overall Configuration]

Figure 1:
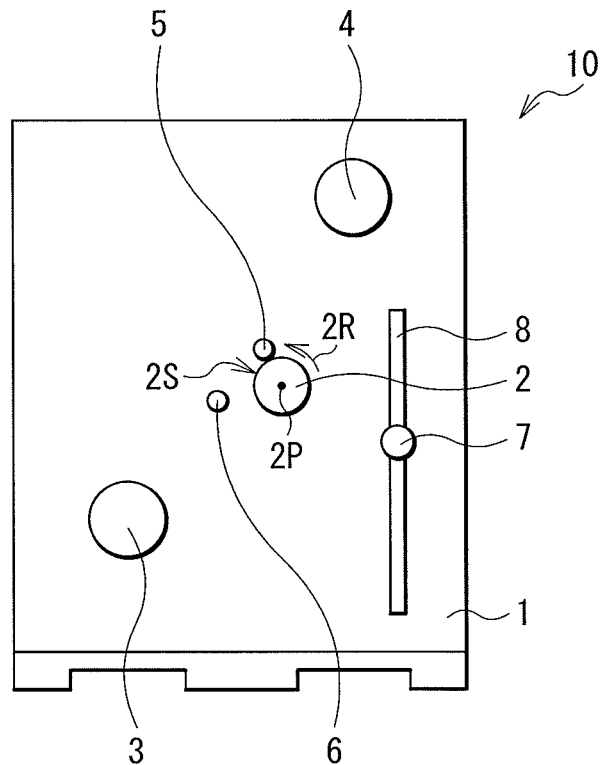
FIG. 1 is a plan view of a configuration of a removing unit according to a first example embodiment of the invention.

First, a description is given of a configuration of a removing unit 10 corresponding to the removing unit according to the first example embodiment. FIG. 1 illustrates a plan configuration of the removing unit 10 as viewed from a side thereof.

The side on which the removing unit 10 is placed (the lower side in FIG. 1) is referred to as the "lower side" or its variants, and the side opposite to the side on which the removing unit 10 is placed (the upper side in FIG. 1) is referred to as the "upper side" or its variants in the description below.

Referring to FIG. 1, the removing unit 10 may include a unit body 1, for example. The removing unit 10 may also include conveying rollers 2, 5, and 6, take-up rollers 3 and 4, and a tension bar 7 that are provided on one surface of the unit body 1, for example. It is to be noted that FIG. 1 illustrates a state in which the stack 20 is not yet put in the removing unit 10.

The unit body 1 may be a support member that supports the foregoing series of components such as the conveying roller 2, and may also be a container member that contains components such as a motor which will be described later.

The conveying roller 2 may convey the stack 20 toward the take-up rollers 3 and 4. The stack 20 may be supplied to the removing unit 10 from outside. The conveying roller 2 may be provided almost in the middle of the surface of the unit body 1 in the present example embodiment. The conveying roller 2 may correspond to a "first conveying roller" in one specific but non-limiting embodiment of the invention.

The conveying roller 2 may have a three-dimensional cylindrical shape that extends in a direction intersecting a plane of the paper of FIG. 1. The conveying roller 2 may be rotatable in a rotation direction 2R around a rotation axis 2P that extends in the direction intersecting the plane of the paper of FIG. 1. The rotation direction 2R may be an anticlockwise direction in the present example embodiment.

The conveying roller 2 may rotate utilizing power such as torque of a motor. More specifically, the conveying roller 2 may be, for example, a so-called idle roller as a roller having torque that is adjustable by means of a component such as a torque limiter.

The conveying roller 2 that may be the idle roller may include a roller body and a high friction member, for example. The roller body may have a cylindrical shape and be rotatable in the rotation direction 2R. The high friction member may cover a periphery surface of the roller body. The high friction member may include a material having a high coefficient of friction, for example. More specifically, the high friction member may include one or more of materials such as polyurethane rubber.

The take-up roller 3 may take up the necessary base member 20A included in the stack 20 when a removing process using the stack 20 is performed, for example. The necessary base member 20A may correspond to a "first base member" in one specific but non-limiting embodiment of the invention. The take-up roller 3 may be provided on the lower side with respect to the conveying roller 2 in one surface of the unit body 1 in the present example embodiment.

The take-up roller 3 may have a three-dimensional cylindrical shape as with the conveying roller 2, for example. Further, the take-up roller 3 may be rotatable in a direction same as the rotation direction 2R, for example. The take-up roller 3 may rotate utilizing power such as torque of a motor.

The take-up roller 4 may take up the unnecessary base member 20B included in the stack 20 when the removing process using the stack 20 is performed, for example. The unnecessary base member 20B may correspond to a "second base member" in one specific but non-limiting embodiment of the invention. The take-up roller 4 may be provided on the upper side with respect to the conveying roller 2 in one surface of the unit body 1 in the present example embodiment.

The take-up roller 4 may have a three-dimensional cylindrical shape as with the conveying roller 2, for example. Further, the take-up roller 4 may be rotatable in a direction same as the rotation direction 2R, for example. The take-up roller 4 may rotate utilizing power such as torque of a motor, as with the take-up roller 3.

The conveying roller 5 may convey, toward the take-up roller 4, the unnecessary base member 20B from which the necessary base member 20A has been removed, when the removing process using the stack 20 is performed, for example. The conveying roller 5 may have a three-dimensional cylindrical shape as with the conveying roller 2, for example. Further, the conveying roller 5 may be rotatable in a direction opposite to the rotation direction 2R, for example. The conveying roller 5 may correspond to a "second conveying roller" in one specific but non-limiting embodiment of the invention.

The conveying roller 5 may be so provided in a vicinity of the conveying roller 2 as to be separated away from the conveying roller 2, for example. Details such as a function and a position of the conveying roller 5 will be described later.

The conveying roller 6 may vary a conveying direction D (which will be described later referring to FIG. 6) of the necessary base member 20A which has been removed from the unnecessary base member 20B while conveying the necessary base member 20A toward the take-up roller 3, when the removing process using the stack 20 is performed, for example. The conveying roller 6 may have a three-dimensional cylindrical shape as with the conveying roller 2, for example. Further, the conveying roller 6 may be rotatable in the direction opposite to the rotation direction 2R, for example. The conveying roller 6 may correspond to a "third conveying roller" in one specific but non-limiting embodiment of the invention.

The conveying roller 6 may be so provided in the vicinity of the conveying roller 2 as to be separated away from each of the conveying rollers 2 and 5, for example. Details such as a function and a position of the conveying roller 6 will be described later.

The tension bar 7 may have a function of adjusting a tension of the stack 20. The tension bar 7 may be movable (slidable) upward and downward along a rail 8. The rail 8 may be provided on one surface of the unit body 1 and extend in a height direction of the unit body 1. The tension bar 7 may have a three-dimensional cylindrical shape as with the conveying roller 2, for example. Further, the tension bar 7 may be rotatable in the direction opposite to the rotation direction 2R, for example. Details of a function of the tension bar 7 will be described later.

[Configuration of Main Part]

Figure 2:
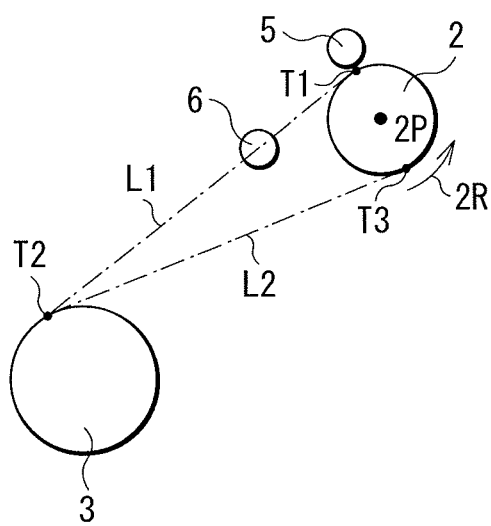
FIG. 2 is a plan view of a configuration of a main part of the removing unit illustrated in FIG. 1, in an enlarged manner.

FIG. 2 illustrates, in an enlarged manner, a plan configuration of a main part of the removing unit 10 illustrated in FIG. 1. It is to be noted that FIG. 2 includes illustration of the conveying rollers 2, 5, and 6 and the take-up roller 3.

Referring to FIG. 2, the respective conveying rollers 2, 5, and 6 may have positions that are set to achieve a predetermined positional relationship.

The conveying roller 2 may be rotatable in a direction (the rotation direction 2R) corresponding to the conveying direction D of the necessary base member 20A, and convey the stack 20 supplied from the outside toward the take-up rollers 3 and 4, as described above. The conveying rollers 5 and 6 may have the respective positions that are set as follows with respect to the conveying direction D of the necessary base member 20A in the present example embodiment.

The conveying roller 5 may be provided upstream in the conveying direction D. The wording "provided upstream in the conveying direction D" refers to a state in which the conveying roller 5 is provided relatively upstream from the conveying roller 6 in the conveying direction D, when comparing the respective positions of the conveying rollers 5 and 6 to each other.

The conveying roller 6 may be provided downstream in the conveying direction D. The wording "provided downstream in the conveying direction D" refers to a state in which the conveying roller 6 is provided relatively downstream from the conveying roller 5 in the conveying direction D, when comparing the respective positions of the conveying rollers 5 and 6 to each other.

The respective positions of the conveying rollers 5 and 6 are not particularly limited as long as the respective positions of the conveying rollers 5 and 6 satisfy the foregoing positional relationship. However, the respective positions of the conveying rollers 5 and 6 may be preferably set to satisfy the following two positional relationships, in particular. It is to be noted that the respective positions of the conveying rollers 5 and 6 may satisfy only one of the two positional relationships, or may satisfy both of the two positional relationships.

The first positional relationship is as follows. The conveying roller 5 may be preferably provided closer to the take-up roller 4 than the conveying roller 6, and the conveying roller 6 may be preferably provided closer to the take-up roller 3 than the conveying roller 5.

The wording "provided closer to the take-up roller 4 than the conveying roller 6" related to the position of the conveying roller 5 refers to an arrangement in which, relative to the take-up roller 4, the conveying roller 5 is located closer to the take-up roller 4 than the conveying roller 6. The wording "provided closer to the take-up roller 3 than the conveying roller 5" related to the position of the conveying roller 6 refers to an arrangement in which, relative to the take-up roller 3, the conveying roller 6 is located closer to the take-up roller 3 than the conveying roller 5.

Accordingly, the conveying roller 5 may be preferably provided on the upper side with respect to the conveying roller 6, when the take-up roller 4 is provided on the upper side with respect to the conveying roller 2, for example. Further, the conveying roller 6 may be preferably provided on the lower side with respect to the conveying roller 5, when the take-up roller 3 is provided on the lower side with respect to the conveying roller 2, for example.

One reason for this is because this makes it easier for the unnecessary base member 20B to be conveyed by the conveying roller 5 toward the take-up roller 4, and also makes it easier for the necessary base member 20A to be conveyed by the conveying roller 6 toward the take-up roller 3, after the necessary base member 20A has been removed from the unnecessary base member 20B.

The second positional relationship is as follows. The respective positions of the conveying rollers 5 and 6 may be preferably set with respect to a tangent L1. The tangent L1 is a virtual line that is tangent to both of the conveying roller 2 and the take-up roller 3. More specifically, the tangent L1 is the virtual line that is tangent to the conveying roller 2 (a circular profile of the conveying roller 2) on the conveying roller 5 side (on the upper side) of the conveying roller 2, and is also tangent to the take-up roller 3 (a circular profile of the take-up roller 3) on the conveying roller 5 side (on the upper side) of the take-up roller 3. In other words, the tangent L1 is the virtual line that is tangent to the conveying roller 2 at a position (a point of tangency T1) at which the conveying roller 2 is opposed to the conveying roller 5, and is also tangent to the take-up roller 3 at a position (a point of tangency T2) that corresponds to the point of tangency T1 of the conveying roller 2. The tangent L1 may correspond to a "first tangent" in one specific but non-limiting embodiment of the invention.

It is to be noted that the tangent T1 corresponds to a path along which, where the conveying roller 6 is not provided, the necessary base member 20A is conveyed at the beginning of the taking-up of the necessary base member 20A by the take-up roller 3. In other words, the tangent T1 corresponds to the conveying path (a traveling line) of the necessary base member 20A in a case where the necessary base member 20A passes between the conveying rollers 2 and 5 and is taken up by the take-up roller 3, where the conveying roller 6 is not provided.

More specifically, the conveying roller 5 may be preferably provided upstream from the tangent L1 in the rotation direction 2R, for example. In other words, the conveying roller 5 may be preferably provided upstream from the tangent L1 in the conveying direction D of the necessary base member 20A which has been removed from the unnecessary base member 20B, for example. Further, the conveying roller 6 may be preferably so provided as to overlap the tangent L1. In other words, the conveying roller 6 may be preferably so provided as to overlap the tangent L1 in the conveying direction D of the necessary base member 20A described above. Accordingly, the conveying roller 5 may be preferably provided closer to the take-up roller 4 than the tangent L1 (on the upper side with respect to the tangent L1) when the conveying roller 5 is provided on the upper side with respect to the conveying roller 6 as described above, for example.

When the conveying roller 5 is provided upstream from the tangent L1 in the rotation direction 2R, the unnecessary base member 20B may be conveyed by the conveying roller 5 toward the take-up roller 4 more easily, after the necessary base member 20A is removed from the unnecessary base member 20B, as described above. When the conveying roller 6 is so provided as to overlap the tangent L1 in addition to the foregoing positional condition, the conveying direction D is varied while the necessary base member 20A is conveyed by the conveying roller 6, and a removing angle $\theta 1$ (which will be described later referring to FIG. 6) is allowed to be sufficiently large. Advantages brought by the sufficiently-large removing angle $\theta 1$ will be described later.

[Other Configurations]

It is to be noted that the removing unit 10 may include one or more other components together with the foregoing series of components, for example.

Non-limiting examples of the other components may include a torque limiter that controls the rotation of the conveying roller 2, a motor that causes the take-up roller 3 to rotate, a motor that causes the take-up roller 4 to rotate, and a sensor that detects a position of the tension bar 7.

A configuration and an operation principle of the torque limiter are not particularly limited. The torque limiter may be a magnetic torque limiter that uses a permanent magnet, and utilize magnetic force of the permanent magnet to put a load of about several hundred gram force on the conveying roller 2, for example.

[Configuration of Stack]

A description is given below of a specific configuration of the stack 20 that is to be put in the removing unit 10.

The stack 20 may have any configuration without particular limitation as long as the stack 20 includes two base members (the necessary base member 20A and the unnecessary base member 20B) that are removably stacked with respect to each other. The necessary base member 20A may be a single layer, or may include multiple layers. The unnecessary base member 20B may also be a single layer, or may include multiple layers.

The stack 20 may be used for any use without particular limitation as long as it is necessary to perform removing on the stack 20 by means of the removing unit 10 for some reasons.

Figure 3:
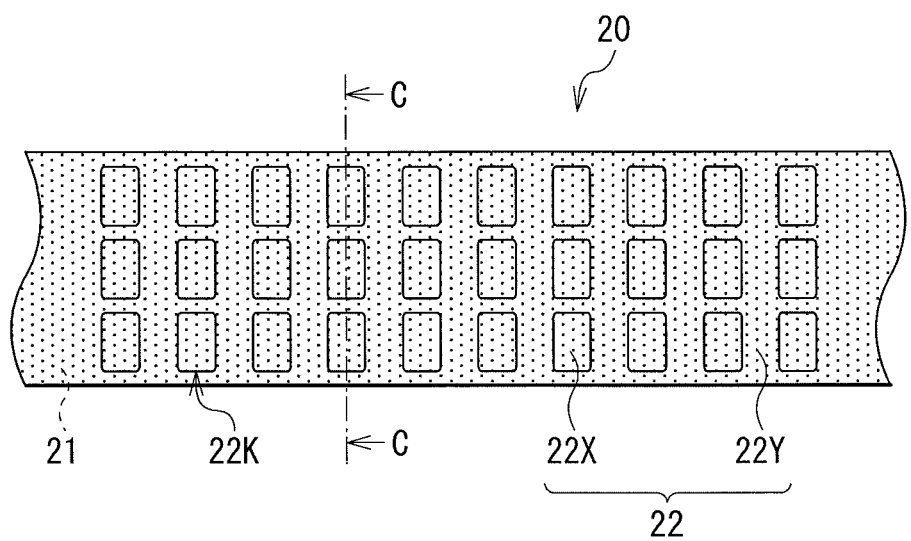
FIG. 3 is a plan view of a configuration of a stack.
Figure 4:
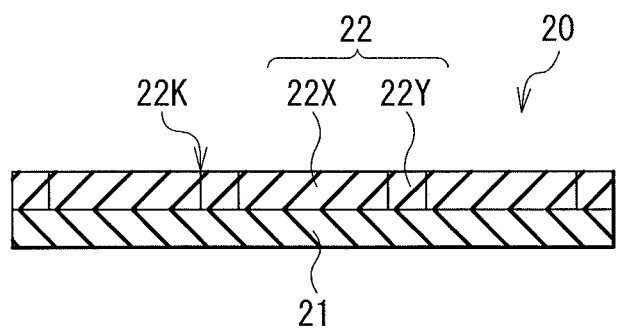
FIG. 4 is a cross-sectional view of the configuration of the stack illustrated in FIG. 3 taken along a line C-C.

FIG. 3 illustrates a plan configuration of the stack 20. FIG. 4 illustrates a cross-sectional configuration of the stack 20 illustrated in FIG. 3 taken along a line C-C.

Referring to FIGS. 3 and 4, the stack 20 may include a removing base member 21 and a seal base member 22 in the present example embodiment. The seal base member 22 may be removably adhered onto a surface of the removing base member 21. The stack 20 may have a plan shape of a long strip to allow for continuous conveying of the stack 20 when the stack 20 is put in the removing unit 10. It is to be noted that the seal base member 22 is shaded in FIG. 3 for the sake of convenience in differentiating the seal base member 22 from the removing base member 21.

The removing base member 21 may be a base member that removably supports the seal base member 22. The removing base member 21 may have a surface that is adjacent to the seal base member 22 and that may be provided with a release layer for removal of the seal base member 22, for example. The removing base member 21 may be made of any material without particular limitation, allowing the removing base member 21 to be made of a material such as paper and a plastic film.

The seal base member 22 may be a base member that is to be removed from the removing base member 21 for a desired purpose. The seal base member 22 has a surface that is adjacent to the removing base member 21 and that may be provided with an adhesive layer that achieves adhesiveness with respect to the removing base member 21, for example. The seal base member 22 may be made of any material without particular limitation, allowing the seal base member 22 to be made of a material such as paper and a plastic film.

The stack 20 described in the present example embodiment may be a seal that has been subjected to a half-cutting process, which is a so-called label seal, for example. More specifically, the seal base member 22 may have a cut 22K that provides the seal base member 22 with a desired pattern shape (a desired plan shape), for example. Accordingly, the seal base member 22 may include a region (one or a plurality of label parts 22X) that is surrounded by the cut 22K, and a region (a non-label part 22Y) other than the region surrounded by the cut 22K, for example. The one or the plurality of label parts 22X may be removed from the removing base member 21 on an as-needed basis.

The one or the plurality of label parts 22X may have any one or more plan shapes without particular limitation. All of the one or the plurality of label parts 22X may have the same plan shape which is a rectangular having four rounded corners, in the present example embodiment.

The number and an arrangement of the one or the plurality of label parts 22X are not particularly limited. More specifically, one label part 22X may be provided, or two or more (the plurality of) label parts 22X may be provided alternatively. Further, the label parts 22X may be arranged regularly, or may be arranged randomly. The present example embodiment may include the plurality of label parts 22X that are arranged regularly in a plurality of lines each including three label parts 22X, for example.

<1-2. Operation (Removing Method)>

Next, an operation of the removing unit 10 is described referring to an example that uses the stack 20 which may be the foregoing label seal.

It is to be noted that the removing method according to the first example embodiment of the invention is achieved based on the operation of the removing unit 10. Accordingly, details of the removing method are described below together with the operation of the removing unit 10.

Figure 5:
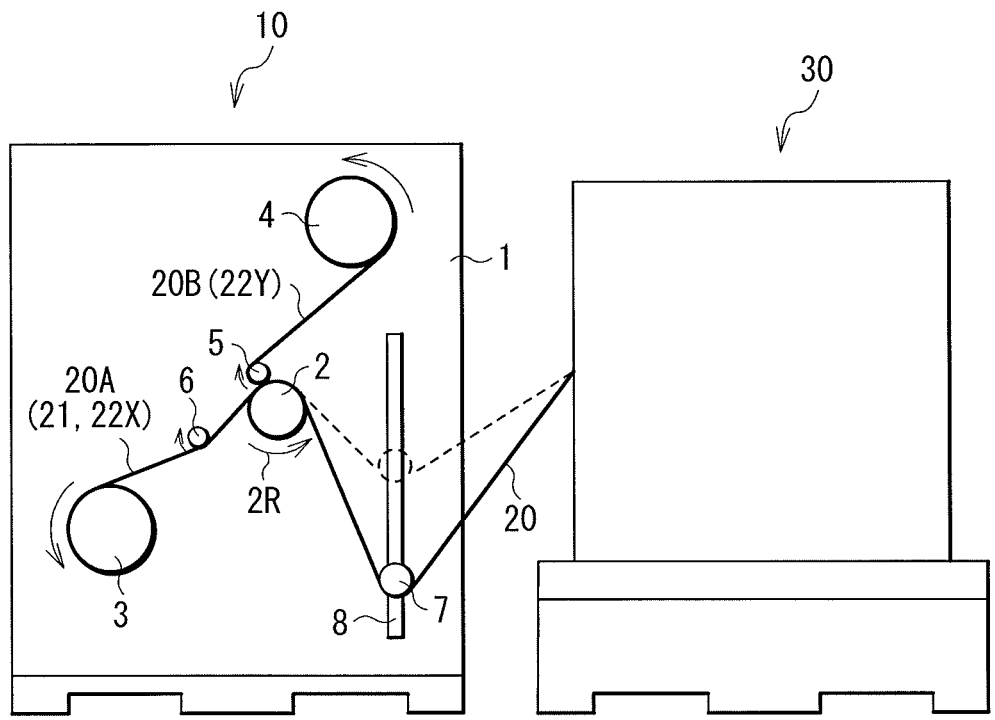
FIG. 5 is a plan view for describing an operation of the removing unit.
Figure 6:
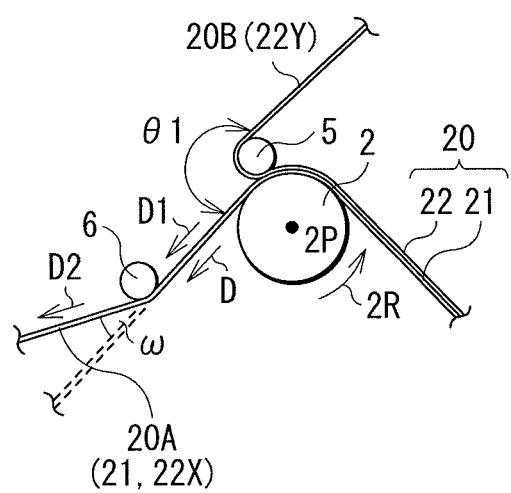
FIG. 6 is a plan view of a configuration of a main part of the removing unit illustrated in FIG. 5, in an enlarged manner.

FIG. 5 illustrates a plan configuration corresponding to that illustrated in FIG. 1, for describing the operation of the removing unit 10. FIG. 6 illustrates, in an enlarged manner, a plan configuration of a main part of the removing unit 10 illustrated in FIG. 5, and corresponds to that illustrated in FIG. 2.

FIG. 5 illustrates an external unit 30 together with the removing unit 10. The external unit 30 may supply the stack 20 to the removing unit 10. Further, FIG. 5 includes arrows that indicate the respective directions in which the take-up rollers 3 and 4 and the conveying rollers 5 and 6 rotate, for the sake of convenience in understanding a procedure to convey the stack 20.

Figure 7:
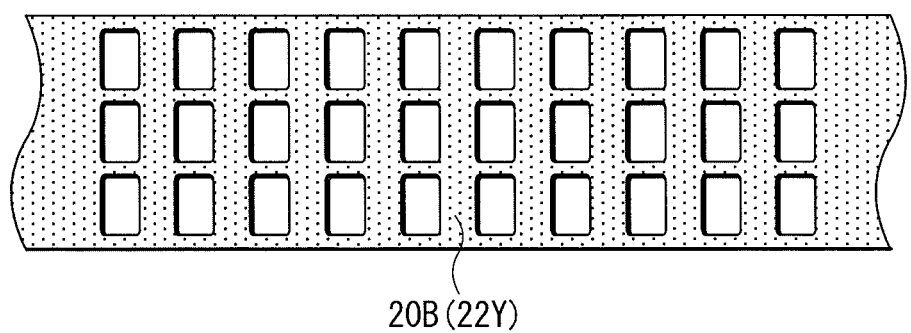
FIG. 7 is a plan view of a configuration of an unnecessary base member.
Figure 8:
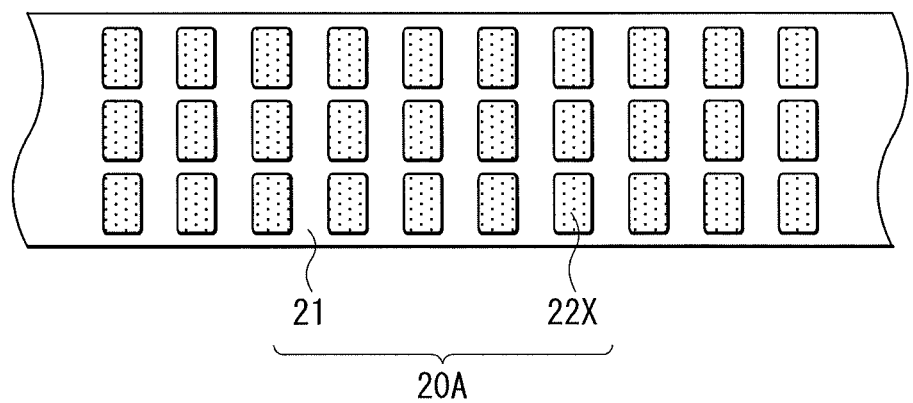
FIG. 8 is a plan view of a configuration of a necessary base member.

FIG. 7 illustrates a plan configuration of the unnecessary base member 20B, and corresponds to that illustrated in FIG. 3. FIG. 8 illustrates a plan configuration of the necessary base member 20A, and corresponds to that illustrated in FIG. 3. The seal base member 22 is shaded in FIGS. 7 and 8 for the sake of convenience in differentiating the seal base member 22 from the removing base member 21.

The external unit 30 may be of any kind without particular limitation, as long as the external unit 30 includes one or more kinds of units that allows for continuous supply of the stack 20 to the removing unit 10. The external unit 30 may be a delivering unit that delivers the stack 20 that has taken up in a roll shape to the outside, for example. Alternatively, the external unit 30 may be an image forming unit (a so-called printer) that forms an image on a surface of the stack 20 that has taken up in a roll shape, and thereafter supplies the stack 20 provided with the image to the outside, for example. The external unit 30 may be a unit other than the delivering unit or the image forming unit described above. The image forming unit may have any image forming scheme without particular limitation, and may have an electrophotographic scheme, for example.

Referring to FIG. 5, the removing unit 10 may allow the stack 20 that has been supplied from the external unit 30 to be conveyed via the tension bar 7 and the conveying roller 2 in order toward the respective take-up rollers 3 and 4, upon supplying of the stack 20 from the external unit 30, for example.

More specifically, the stack 20 may be first conveyed to the conveying roller 2 via the tension bar 7.

The stack 20 may be so supplied from the external unit 30 that the removing base member 21 is on the lower side and the seal base member 22 is on the upper side in the present example embodiment. In other words, the removing base member 21 may be located on the lower side (may be closer to the conveying roller 2 than the seal base member 22), and the seal base member 22 may be located on the upper side (may be farther from the conveying roller 2 than the removing base member 21), when the stack 20 is conveyed to the conveying roller 2.

Moreover, the tension bar 7 may move upward or downward depending on conditions such as a variation in rotation frequency of the take-up roller 3, thereby controlling the tension of the stack 20, while the stack 20 is conveyed, for example.

More specifically, the take-up roller 3 may rotate at a speed greater than a speed at which the stack 20 is supplied from the external unit 30 to the removing unit 10, for example. This may lead to a high tension of the stack 20. Influenced by the high tension of the stack 20, the tension bar 7 may move upward.

Arrival of the tension bar 7 at the highest position thereof may decrease a rotation frequency of the take-up roller 3, while the stack 20 is conveyed, or cause the take-up roller 3 to temporarily stop rotating, for example. This allows for continuous supply of the stack 20 from the external unit 30 to the removing unit 10, allowing the tension bar 7 to move downward utilizing its own weight.

Arrival of the tension bar 7 at the lowest position thereof may increase the rotation frequency of the take-up roller 3, or cause the take-up roller 3 to start rotating again, for example. Accordingly, influenced by the tension of the stack 20, the tension bar 7 may slide upward again.

As described above, the tension bar 7 may move upward or downward depending on the conditions such as the variation in the rotation frequency of the take-up roller 3, making it possible to secure the tension of the stack 20 utilizing the variation in position of the tension bar 7 in the height direction. FIG. 5 illustrates a state in which the tension bar 7 has moved to the lower side.

Thereafter, the stack 20 that has arrived at the conveying roller 2 may be conveyed by the conveying roller 2 to a vicinity of the conveying roller 5.

Referring to FIG. 6, upon arrival of the stack 20 at the vicinity of the conveying roller 5, the necessary base member 20A (the removing base member 21 and the label parts 22X) may be removed from the unnecessary base member 20B (the non-label part 22Y) while the stack 20 passes between the conveying rollers 2 and 5. The unnecessary base member 20B from which the necessary base member 20A has been removed may be conveyed by the conveying roller 5 toward the take-up roller 4, and be thereby taken up by the take-up roller 4. The unnecessary base member 20B may be conveyed in a direction opposite to the conveying direction D of the necessary base member 20A in the present example embodiment. The unnecessary base member 20B that is to be taken up by the take-up roller 4 may have a configuration illustrated in FIG. 7, for example. More specifically, the unnecessary base member 20B may include the non-label part 22Y, for example.

Thereafter, the necessary base member 20A which has been removed from the unnecessary base member 20B may be conveyed by the conveying roller 6 toward the take-up roller 3, and be thereby taken up by the take-up roller 3. The conveying direction D of the necessary base member 20A may be varied at a point where the conveying roller 6 is present, owing to the conveying roller 6 so provided as to overlap the tangent L1 as described above referring to FIG. 2, in the present example embodiment. More specifically, the conveying direction D of the necessary base member 20A before passing the point where the conveying roller 6 is present (upstream from the conveying roller 6 in the conveying direction D) may be a conveying direction D1. In contrast, the conveying direction D of the necessary base member 20A after passing the point where the conveying roller 6 is present (downstream from the conveying roller 6 in the conveying direction D) may be a conveying direction D2 that is different from the foregoing conveying direction D1. An angle $\omega$ formed by the conveying directions D1 and D2 may be smaller than 90°, for example, without particular limitation. More specifically, the conveying roller 6 may vary the conveying direction D of the necessary base member 20A to allow the angle $\omega$ formed by the conveying direction D1 of the necessary base member 20A upstream from the conveying roller 6 and the conveying direction D2 of the necessary base member 20A downstream from the conveying roller 6 to be smaller than 90°, for example. When the angle $\omega$ is equal to or larger than 90°, the label parts 22X may be bent excessively in the middle of conveying of the necessary base member 20A. This may possibly lead to unintentional removal of the bent label parts 22X from the removing base member 21. In contrast, when the angle $\omega$ is smaller than 90°, excessive bending of the label parts 22X may be avoided. This may lead to a decrease in a possibility of the unintentional removal of the label parts 22X from the removing base member 21. The necessary base member 20A that is to be taken up by the take-up roller 3 may have the configuration illustrated in FIG. 8, for example. More specifically, the necessary base member 20A may include the removing base member 21 and the label parts 22X, for example.

The removing unit 10 may involve the removing process using the stack 20 that is performed continuously, upon the continuous supply of the stack 20 from the external unit 30 to the removing unit 10, as described above. The unnecessary base member 20B from which the necessary base member 20A has been removed may be conveyed by the conveying roller 5, allowing the conveyed unnecessary base member 20B to be taken up by the take-up roller 4 through the removing process. Further, the conveying direction D may be varied while the necessary base member 20A is conveyed by the conveying roller 6, allowing the conveyed necessary base member 20A to be taken up by the take-up roller 3. This makes it possible to collect only the necessary base member 20A from the stack 20.

<1-3. Workings and Effects>

According to the removing unit 10 of the present example embodiment, the conveying roller 5 that conveys the unnecessary base member 20B from which the necessary base member 20A has been removed may be provided upstream in the conveying direction D. Further, the conveying roller 6 that varies the conveying direction D of the necessary base member 20A which has been removed from the unnecessary base member 20B while conveying the necessary base member 20A may be provided downstream in the conveying direction D. Accordingly, it is possible to achieve a superior removing performance due to the following reason.

Figure 9:
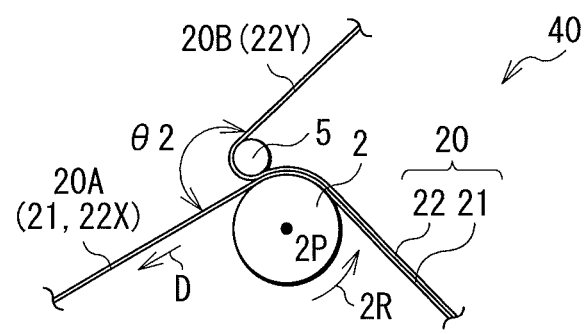
FIG. 9 is a plan view for describing a configuration and an operation of a removing unit according to a comparative example.
Figure 10:
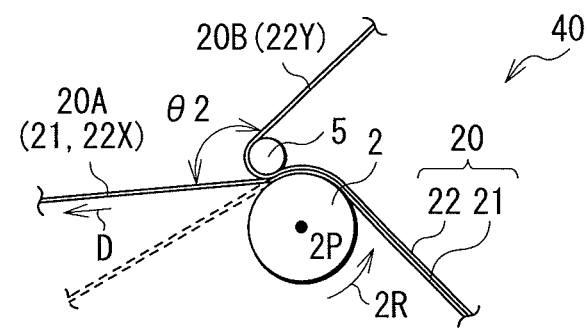
FIG. 10 is another plan view for describing the configuration and the operation of the removing unit according to the comparative example.

FIGS. 9 and 10 each illustrate a plan configuration corresponding to that illustrated in FIG. 6 for describing a configuration and an operation of a removing unit 40 according to a comparative example. The removing unit 40 according to the comparative example has a configuration similar to the configuration of the removing unit 10 of the present example embodiment, except that the removing unit 40 does not include the conveying roller 6. A description is given below of the configuration and the operation of the removing unit 40 of the comparative example, referring to the components included in the removing unit 10 of the present example embodiment, where appropriate.

Removing angles θ1 and θ2 described below are each an angle that is defined in performing the removing process using the stack 20. More specifically, each of the removing angles θ1 and θ2 is an angle that is formed by the conveying direction of the unnecessary base member 20B and the conveying direction D of the necessary base member 20A after the necessary base member 20A is removed from the unnecessary base member 20B.

Referring to FIG. 9, the removing unit 40 of the comparative example allows, immediately after the necessary base member 20A is removed from the unnecessary base member 20B, the necessary base member 20A to be conveyed straight toward the take-up roller 3 from a location where the necessary base member 20A has been removed from the unnecessary base member 20B.

The removing angle θ2 is not sufficiently large, due to the conveying direction D of the necessary base member 20A which is close to the conveying direction of the unnecessary base member 20B in the present comparative example. As a result, the vicinity of the conveying roller 5 may be easily influenced by the decreased tension of the necessary base member 20A, when some factors decrease the tension of the necessary base member 20A. For example, the vicinity of the conveying roller 5 may be easily influenced by a slack in the necessary base member 20A due to the decreased tension of the necessary base member 20A. When the vicinity of the conveying roller 5 is influenced by the decreased tension, the necessary base member 20A is easily conveyed by the conveying roller 5 toward the take-up roller 4 together with the unnecessary base member 20B, due to the adhesive force of the necessary base member 20A with respect to the unnecessary base member 20B. This easily causes a phenomenon that the necessary base member 20A is unintentionally taken-up together with the unnecessary base member 20B, i.e., a so-called co-rising (a defect in removing the necessary base member 20A from the unnecessary base member 20B). The occurrence of the co-rising phenomenon makes it difficult for the necessary base member 20A to be taken up by the take-up roller 3, and may cause the unnecessary base member 20B to be broken in some cases, which results in degradation of the removing performance. In other words, it is difficult to efficiently collect the necessary base member 20A from the stack 20.

Moreover, referring to FIG. 10, the removing unit 40 of the comparative example involves an increase in a diameter of the whole of the necessary base member 20A which has been taken up by the take-up roller 3, in accordance with an increase in an amount of the necessary base member 20A which has been taken up by the take-up roller 3. In this case, the conveying direction D of the necessary base member 20A is brought closer to the conveying direction of the unnecessary base member 20B, reducing the removing angle θ2. This makes the co-rising phenomenon to be caused more easily, which results in further degradation of the removing performance.

In contrast, referring to FIG. 6, the removing unit 10 according to the first example embodiment may allow, immediately after the necessary base member 20A is removed from the unnecessary base member 20B, the conveying direction D to be varied by the conveying roller 6 while the necessary base member 20A is conveyed by the conveying roller 6. Accordingly, the necessary base member 20A is conveyed not straight toward the take-up roller 3 from the location where the necessary base member 20A has been removed from the unnecessary base member 20B, but diverted via the conveying roller 6 toward the take-up roller 3.

In this case, the conveying direction D of the necessary base member 20A is away from the conveying direction of the unnecessary base member 20B, which makes the removing angle θ1 to be sufficiently large, unlike the removing unit 40 of the comparative example. Accordingly, even when some factors decrease the tension of the necessary base member 20A, the vicinity of the conveying roller 5 is less influenced by the decreased tension of the necessary base member 20A, which allows the necessary base member 20A to be less taken up together with the unnecessary base member 20B. This suppresses occurrence of the co-rising, which makes it easier for the necessary base member 20A to be taken up by the take-up roller 3 and makes it difficult for the unnecessary base member 20B to be broken, achieving a superior removing performance. In other words, it is possible to efficiently collect the necessary base member 20A from the stack 20.

Moreover, as can be appreciated from FIG. 6, the removing unit 10 of the present example embodiment prevents the conveying direction D1 from being varied and vary only the conveying direction D2 when the diameter of the whole of the necessary base member 20A which has been taken-up by the take-up roller 3 is varied, allowing the removing angle θ1 to be maintained as it is. As a result, it is possible to achieve a superior removing performance independently of the diameter of the whole of the necessary base member 20A which has been taken-up by the take-up roller 3.

In particular, the removing unit 10 of the first example embodiment effectively suppresses the occurrence of the co-rising due to the decreased tension of the necessary base member 20A, even when a factor such as the variation in rotation frequency of the take-up roller 3 may possibly decrease the tension of the necessary base member 20A, as described above. As a result, it is possible to achieve a higher effect.

Moreover, the removing unit 10 of the present example embodiment effectively suppresses the occurrence of the co-rising due to the decreased tension of the stack 20, also when a function of controlling the tension of the stack 20 by means of the tension bar 7 is provided, as described above. As a result, it is possible to achieve a higher effect.

In addition thereto, providing the conveying roller 5 upstream from the tangent L1 in the rotation direction 2R, and so providing the conveying roller 6 as to overlap the tangent L1 allow the removing angle θ1 to be sufficiently large. As a result, it is possible to achieve a higher effect.

According to the removing method of the first example embodiment of the invention, the unnecessary base member 20B from which the necessary base member 20A has been removed is conveyed using the conveying roller 5 provided upstream in the conveying direction D. Further, the conveying direction D is varied by the conveying roller 6 provided downstream in the conveying direction D, while the necessary base member 20A which has been removed from the unnecessary base member 20B is conveyed by the conveying roller 6. As a result, it is possible to achieve a superior removing performance owing to a reason similar to that described above related to the removing unit 10 of the present example embodiment of the invention.

2. Second Example Embodiment (Removing Unit and Removing Method)

Next, a removing unit and a removing method of a second example embodiment of the invention are described.

Figure 11:
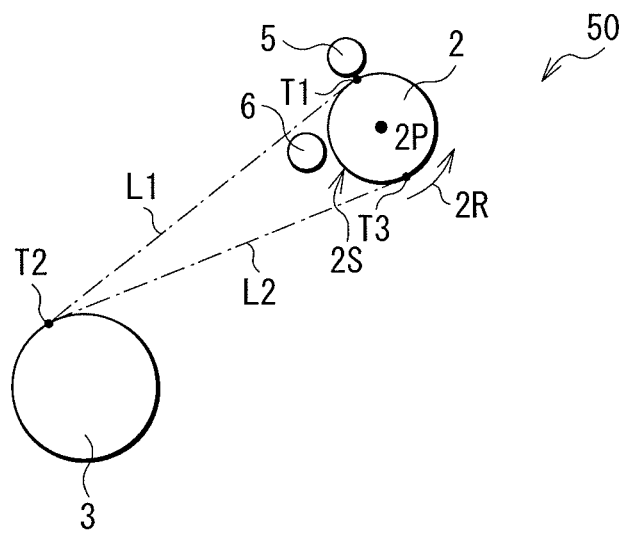
FIG. 11 is a plan view of a configuration of a main part of a removing unit according to a second example embodiment of the invention, in an enlarged manner.
Figure 12:
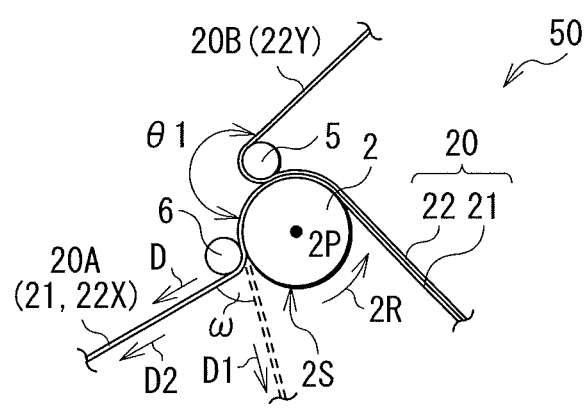
FIG. 12 is a plan view for describing an operation of the removing unit illustrated in FIG. 11.

FIG. 11 illustrates, in an enlarged manner, a configuration of a main part of a removing unit 50 corresponding to the removing unit of the second example embodiment of the invention. FIG. 11 illustrates a plan configuration corresponding to that illustrated in FIG. 2. FIG. 12 illustrates a plan configuration corresponding to that illustrated in FIG. 6, for describing an operation of the removing unit 50 illustrated in FIG. 11.

The removing unit 50 of the present example embodiment may have a configuration similar to the configuration of the removing unit 10 of the first example embodiment, except that the position of the conveying roller 6 is different from that in the removing unit 10 of the first example embodiment. It is to be noted that the removing method of the present example embodiment is achieved based on the operation of the removing unit 50. Details of the removing method are therefore described below together with the operation of the removing unit 50.

Referring to FIG. 11, the conveying roller 6 may be provided downstream from the tangent L1 in the rotation direction 2R, for example. In other words, the conveying roller 6 may be provided downstream from the tangent L1 in the conveying direction D of the necessary base member 20A which has been removed from the unnecessary base member 20B, for example. Accordingly, the conveying roller 6 is provided closer to the take-up roller 3 than the tangent L1 (on the lower side with respect to the tangent L1), when the conveying roller 5 is provided on the upper side with respect to the conveying roller 6. Provision of the conveying roller 6 downstream from the tangent L1 in the rotation direction 2R may increase the removing angle θ1 (referring to FIG. 12).

The position of the conveying roller 6 may be preferably set with respect to a tangent L2. The tangent L2 is a virtual line that is tangent to the conveying roller 2 (the circular profile of the conveying roller 2) on opposite side to the conveying roller 5 side (on the lower side) of the conveying roller 2, and is tangent to the take-up roller 3 (the circular profile of the take-up roller 3) on the conveying roller 5 side (on the upper side) of the take-up roller 3, and is different from the foregoing tangent L1. In other words, the tangent L2 is the virtual line that is tangent to the conveying roller 2 at a position (a point of tangency T3) that is on the opposite side to the point of tangency T1 on the profile of the conveying roller 2, and is also tangent to the take-up roller 3 at the point of tangency T2. The tangent L2 corresponds to a "second tangent" in one specific but non-limiting embodiment of the invention.

More specifically, the conveying roller 6 may be preferably provided upstream from the tangent L2 in the rotation direction 2R, for example. In other words, the conveying roller 6 may be preferably provided upstream from the tangent L2 in the conveying direction D of the necessary base member 20A described above, for example. Accordingly, the conveying roller 6 may be preferably provided closer to the conveying roller 5 than the tangent L2 (on the upper side with respect to the tangent L2), when the conveying roller 5 is provided on the upper side with respect to the conveying roller 6, for example.

Provision of the conveying roller 6 on the upper side with respect to the tangent L2 prevents a distance, at which the necessary base member 20A is conveyed from the conveying roller 2 to the take-up roller 3, from being excessively long, when the necessary base member 20A is taken up by the take-up roller 3 via the conveying roller 6. This makes it easier to smoothly and stably take up the necessary base member 20A, which is conveyed from the conveying roller 2 via the conveying roller 6, by the take-up roller 3, while allowing the removing angle θ1 to be large.

In particular, provision of the conveying roller 6 downstream from the tangent L1 in the rotation direction 2R and provision of the conveying roller 6 upstream from the tangent L2 in the rotation direction 2R make it easier for the take-up roller 3 to smoothly and stably take up the necessary base member 20A, while allowing the removing angle θ1 to be sufficiently large.

The operation of the removing unit 50 may be similar to the operation of the removing unit 10 described above, except that a state of conveying the necessary base member 20A which has been removed from the unnecessary base member 20B is different from that related to the removing unit 10 described above.

Specifically, referring to FIGS. 11 and 12, provision of the conveying roller 6 downstream from the tangent L1 in the rotation direction 2R allows the necessary base member 20A which has been removed from the unnecessary base member 20B to be conveyed along a surface 2S of the conveying roller 2 by means of the conveying roller 6, and to be conveyed thereafter toward the take-up roller 3, for example. Accordingly, the conveying direction D of the necessary base member 20A is varied by the conveying roller 6 while the necessary base member 20A is conveyed by the conveying roller 6, which varies the conveying direction D of the necessary base member 20A from D1 to D2 at the point where the conveying roller 6 is present.

The removing unit 50 and the removing method of the present example embodiment also achieve a superior removing performance owing to a reason similar to that described above related to the removing unit 10 and the removing method of the first example embodiment.

In particular, provision of the conveying roller 6 downstream from the tangent L1 in the rotation direction 2R allows the removing angle θ1 to be larger. As a result, it is possible to achieve a higher effect.

Moreover, provision of the conveying roller 6 upstream from the tangent L2 in the rotation direction 2R makes it easier for the take-up roller 3 to smoothly and stably take up the necessary base member 20A while allowing the removing angle θ1 to be sufficiently large. As a result, it is possible to achieve a higher effect.

It is to be noted that other workings and effects of the present example embodiment may be similar to those of the first example embodiment.

3. Modifications

The foregoing configuration of the removing unit 10 is modifiable as appropriate. It is to be also noted that a series of modifications described below is applicable not only to the removing unit 10 but also to the removing unit 50.

Specifically, referring to FIG. 1, the conveying roller 5 is provided on the upper side with respect to the conveying roller 6 due to the take-up roller 3 provided on the lower side with respect to the conveying roller 2 and the take-up roller 4 provided on the upper side with respect to the conveying roller 2. However, the respective positions of the conveying rollers 5 and 6 are not particularly limited, as long as the respective positions of the conveying rollers 5 and 6 satisfy the foregoing positional relationship thereof.

More specifically, the conveying roller 5 may be provided on the lower side with respect to the conveying roller 6, when the take-up roller 3 is provided on the upper side with respect to the conveying roller 2 and the take-up roller 4 is provided on the lower side with respect to the conveying roller 2. It is possible to achieve a similar effect also in this case, as long as the conveying roller 5 is provided upstream in the conveying direction D and the conveying roller 6 is provided downstream in the conveying direction D.

Moreover, referring to FIGS. 1 and 6, the necessary base member 20A is conveyed on the lower side of the conveying roller 6. However, the necessary base member 20A may be conveyed on the upper side of the conveying roller 6. It is possible to achieve a similar effect also in this modification.

Moreover, referring to FIG. 1, the removing unit 10 may include the tension bar 7. However, the removing unit 10 may not include the tension bar 7. It is possible to achieve a similar effect also in this modification.

Moreover, referring to FIG. 1, the removing unit 10 has a configuration in which the rotation direction 2R corresponds to the anticlockwise direction. However, the removing unit 10 may have a configuration in which the rotation direction 2R corresponds to a clockwise direction. It is possible to achieve a similar effect also in this modification.

Moreover, referring to FIG. 5, the external unit 30 may supply the stack 20 to the removing unit 10. However, the stack 20 may be supplied from the outside to the removing unit 10 without using the external unit 30. Examples of a method of supplying the stack 20 to the removing unit 10 without using the external unit 30 may include a method in which the stack 20 is supplied to the removing unit 10 by hand. It is possible to achieve a similar effect also in this modification.

The configuration of the stack 20 that is to be put in the removing unit 10 is also modifiable as appropriate. The stack 20 may not be a seal as long as the stack 20 includes two base members which are removably stacked with respect to each other.

The invention has been described above referring to some example embodiments; however, the invention is not limited to the series of example embodiments described above, and may be variously modified.

It is possible to achieve at least the following configurations from the above-described example embodiments of the invention.

(1) A removing unit, including:
a first conveying roller that conveys a stack including a first base member and a second base member which are removably stacked with respect to each other;
a second conveying roller that conveys the second base member from which the first base member has been removed;
a third conveying roller that conveys the first base member which has been removed from the second base member, along a surface of the first conveying roller; and
a take-up roller that takes up the first base member which has been conveyed by the third conveying roller,
the second conveying roller being provided upstream from a first tangent in a conveying direction of the first base member which has been removed from the second base member, the first tangent being tangent to the first conveying roller on second-conveying-roller side on which the second conveying roller is provided and tangent to the take-up roller on the second-conveying-roller side, and
the third conveying roller being provided to overlap the first tangent in the conveying direction of the first base member, or provided downstream from the first tangent in the conveying direction of the first base member.

(2) The removing unit according to (1), wherein the third conveying roller is provided upstream from a second tangent in the conveying direction of the first base member, the second tangent being tangent to the first conveying roller on opposite side to the second-conveying-roller side and tangent to the take-up roller on the second-conveying-roller side.

(3) The removing unit according to (1) or (2), wherein the third conveying roller varies the conveying direction of the first base member to allow an angle to be smaller than ninety degrees, the angle being formed by the conveying direction of the first base member upstream from the third conveying roller and the conveying direction of the first base member downstream from the third conveying roller.

(4) The removing unit according to any one of (1) to (3), wherein
the stack includes a removing base member and a seal base member, the seal base member being removably attached onto a surface of the removing base member and including one or a plurality of label parts and a non-label part, the one or the plurality of label parts having a predetermined pattern shape, and the non-label part being a part, of the seal base member, other than the one or the plurality of label parts,
the first base member includes the removing base member and the one or the plurality of label parts, and
the second base member includes the non-label part.

(5) A removing method, including:
conveying, by a first conveying roller, a stack including a first base member and a second base member which are removably stacked with respect to each other;
conveying, by a second conveying roller, the second base member from which the first base member has been removed;
conveying, by a third conveying roller, the first base member which has been removed from the second base member, along a surface of the first conveying roller; and
taking up, by a take-up roller, the first base member which has been conveyed by the third conveying roller,
the second conveying roller being provided upstream from a first tangent in a conveying direction of the first base member which has been removed from the second base member, the first tangent being tangent to the first conveying roller on second-conveying-roller side on which the second conveying roller is provided and tangent to the take-up roller on the second-conveying-roller side, and the third conveying roller being provided to overlap the first tangent in the conveying direction of the first base member, or provided downstream from the first tangent in the conveying direction of the first base member.

(6) The removing method according to (5), wherein the third conveying roller is provided upstream from a second tangent in the conveying direction of the first base member, the second tangent being tangent to the first conveying roller on opposite side to the second-conveying-roller side and tangent to the take-up roller on the second-conveying-roller side.

(7) The removing method according to (5) or (6), further including varying, by the third conveying roller, the conveying direction of the first base member to allow an angle to be smaller than ninety degrees, the angle being formed by the conveying direction of the first base member upstream from the third conveying roller and the conveying direction of the first base member downstream from the third conveying roller.

(8) The method according to any one of (5) to (7), wherein
  the stack includes a removing base member and a seal base member, the seal base member being removably attached onto a surface of the removing base member and including one or a plurality of label parts and a non-label part, the one or the plurality of label parts having a predetermined pattern shape, and the non-label part being a part, of the seal base member, other than the one or the plurality of label parts,
  the first base member includes the removing base member and the one or the plurality of label parts, and
  the second base member includes the non-label part.

Although the invention has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A removing unit, comprising:
  a first take-up roller that takes up, from a stack including a first base member and a second base member which are removably stacked with respect to each other, the first base member removed from the second base member;
  a second take-up roller that takes up the second base member removed from the first base member of the stack;
  a first roller provided upstream of the first take-up roller in a conveying direction of the first base member removed from the second base member and upstream of the second take-up roller in a conveying direction of the second base member removed from the first base member, the first roller rotating while being in contact with the stack;
  a second roller provided downstream of the first roller in the conveying direction of the second base member removed from the first base member and upstream of the second take-up roller in the conveying direction of the second base member removed from the first base member, the second roller positioned such that the stack is directed between the first roller and the second roller, and the second base member removed from the first base member is directed along a surface of the second roller so as to rotate the second roller; and
  a third roller provided downstream of the first roller in the conveying direction of the first base member removed from the second base member and upstream of the first take-up roller in the conveying direction of the first base member removed from the second base member, the third roller positioned such that the first base member is positioned between the third roller and the first roller as the first base member moves between the third roller and the first roller, and such that the first base member continues to move along a surface of the third roller downstream of a point where the first base member separates from the first roller, and the third roller configured to rotate based on being in moving contact with the first base member removed from the second base member,
  wherein a tangent to a surface of the first roller facing a surface of the second roller is tangent to a surface of the first take-up roller, and
  the third roller is provided to overlap the tangent, or is provided downstream from the tangent in a rotation direction of the first roller and provided upstream from a virtual line in the rotation direction of the first roller, the virtual line being a straight line that is tangent to the first roller on an opposite side of the first roller from a side of the first roller facing the second roller and passes a point of tangency of the first take-up roller on the tangent.

2. The removing unit according to claim 1, wherein the third roller varies the conveying direction of the first base member removed from the second base member to allow an angle to be smaller than ninety degrees, the angle being formed by the conveying direction of the first base member upstream from the third roller and the conveying direction of the first base member downstream from the third roller.

3. The removing unit according to claim 1, wherein
  the stack includes a removing base member and a seal base member, the seal base member being removably attached onto a surface of the removing base member and including one or a plurality of label parts and a non-label part, the one or the plurality of label parts having a predetermined pattern shape, and the non-label part being a part, of the seal base member, other than the one or the plurality of label parts,
  the first base member includes the removing base member and the one or the plurality of label parts, and
  the second base member includes the non-label part.

4. The removing unit according to claim 1, further comprising a tension adjuster that includes a tension bar, the tension bar being movable by utilizing a rail, the tension adjuster adjusting tension of the stack by utilizing the movement of the tension bar.

5. The removing unit according to claim 1, wherein the first take-up roller, the second take-up roller, the first roller, the second roller, and the third roller are each cylindrical.

6. The removing unit according to claim 1, wherein one of the first take-up roller and the second take-up roller is disposed above the first roller, and the other of the first take-up roller and the second take-up roller is disposed below the first roller.

\* \* \* \* \*